United States Patent [19]
Lawman

[11] Patent Number: 5,946,478
[45] Date of Patent: Aug. 31, 1999

[54] METHOD FOR GENERATING A SECURE MACRO ELEMENT OF A DESIGN FOR A PROGRAMMABLE IC

[75] Inventor: Gary R. Lawman, San Jose, Calif.

[73] Assignee: Xilinx, Inc., San Jose, Calif.

[21] Appl. No.: 08/857,439

[22] Filed: May 16, 1997

[51] Int. Cl.$^6$ .................................................. G06F 17/50
[52] U.S. Cl. .............................. 395/500.18; 395/500.17
[58] Field of Search ................................. 364/488–491; 395/500.02–500.19; 326/68, 39

[56] References Cited

U.S. PATENT DOCUMENTS

| | | | |
|---|---|---|---|
| 5,426,379 | 6/1995 | Trimberger | 326/39 |
| 5,448,493 | 9/1995 | Topolewski et al. | 364/489 |
| 5,594,657 | 1/1997 | Cantone et al. | 364/490 |
| 5,635,855 | 6/1997 | Tang | 326/38 |
| 5,761,078 | 6/1998 | Fuller et al. | 364/489 |
| 5,761,484 | 6/1998 | Agarwal et al. | 395/500 |
| 5,815,405 | 9/1998 | Baxter | 364/489 |

OTHER PUBLICATIONS

Lucent Technologies Data Book, Oct. 1996, "Field–Programmable Gate Arrays", pp. 2–45 through 2–54, available from Lucent Technologies, 555 Union Boulevard Room 30L–15P–BA, Allentown PA 18103.

Application Note 38 "Configuring Multiple FLEX 8000 Devices", May, 1994, version 2, available from Altera Corporation, pp. 4–56 to 4–57.

K. Shahookar and P. Mazumder, "VLSI Cell Placement Techniques", ACM Computing Surveys, vol. 23, No. 2, Jun. 1991, pp. 143–220.

Brown, Stephen D. et al., Field–Programmable Gate Arrays, Kluwer Academic Publishers, 1992, pp. 45–86, and 117–145.

Bryan T. Preas and Michael J. Lorenzetti, *Physical Design Automation of VLSI Systems*, Benjamin/Cummings Publishing Co., Inc., Menlo Park, California, 1988, pp. 65–210.

Libraries Guide, available from Xilinx, Inc., 2100 Logic Drive, San Jose, CA 95124, Oct. 1995, pp. 4–71 through 4–72.

"XC4000 Hard Macro Style Guide", available from Xilinx, Inc., 2100 Logic Drive, San Jose, Ca 95124, Sep. 3, 1991, pp. 2–24.

The Programmable Logic Data Book, available from Xilinx, Inc., 2100 Logic Drive, San Jose, Ca 95124, 1996, pp. 4–56 through 4–57, Jun. 1, 1996.

Application Note 38 ("Configuring Multiple FLEX 800 Devices", May 1994, version 2, available from Altera Corporation, pp. 4–56 to 4–57).

Lucent Technologies Data Book ("Filed–Programmable Gate Arrays", Oct. 1996, pp. 2–45 to 2–54, available from Lucent Technologies).

The Programmable Logic Data Book (available from Xilinx, Inc., San Jose, CA, Jun. 1, 1996, pp. 4–56 to 4–57).

Golden et al. ("Design Automation and the programmable logic array macro", IBM Journal of Research and Development, vol. 24, No. 1, pp. 23–31, Jan. 1, 1980).

*Primary Examiner*—Kevin J. Teska
*Assistant Examiner*—Phallaka Kik
*Attorney, Agent, or Firm*—Lois D. Cartier

[57] ABSTRACT

A method of generating and using a secure macro element for configuring programmable ICs is provided. The method provides a bitstream to a user, rather than providing a user-editable macro. Compilation software is provided to the user that combines the data from a "macro bitstream" (the bitstream comprising the macro data description) and the data from the user's own circuits to create the complete bitstream. The compilation software reserves the relevant portions of the complete bitstream for the macro, and does not assign user circuits to the areas controlled by those portions of the bitstream. In one embodiment of the invention, the user specifies a physical location on the programmable IC for the macro, so the macro data is optionally placed in a different location in the complete bitstream than in the macro bitstream. In another embodiment, the macro bitstream and the complete bitstream represent the same programmable IC architecture, but not the same device, so they are of similar formats but different lengths.

38 Claims, 7 Drawing Sheets

METHOD FOR GENERATING A SECURE MACRO ELEMENT OF A DESIGN FOR A PROGRAMMABLE IC

BACKGROUND OF THE INVENTION

1. Field Of The Invention

The present invention relates generally to the field of programmable integrated circuits (ICs), and more specifically to a method for generating secure configuration data for programmable ICs.

2. Description of the Background Art

Programmable ICs are typically configured by creating a program file which is then used to program the device. The first step in generating such a program file typically involves defining an electronic circuit using design entry tools to enter a description that is either language-based (e.g., described in Hardware Description Language, or HDL) or schematic-based (built from illustrations of circuit elements or gates). (The term "programmable ICs" as used herein includes, for example, Field Programmable Gate Arrays (FPGAs), mask programmable devices such as Application Specific ICs (ASICs), Programmable Logic Devices (PLDs), and devices in which only a portion of the logic is programmable.) This circuit description is then processed to form a netlist description of the circuit. (A "netlist" is a description of a circuit comprising a list of low-level circuit elements or gates and the connections (nets) between the outputs and inputs thereof.) The resulting netlist is typically compiled using a series of software steps such as: 1) mapping the circuit elements in the netlist into logic blocks available in the programmable IC; 2) placing the mapped logic blocks in specific locations in the programmable IC; and 3) routing the nets between the logic blocks according to the connections specified in the netlist. Mapping (also called partitioning), placing, and routing are described by Bryan T. Preas and Michael J. Lorenzetti on pages 65–210 of "Physical Design Automation of VLSI Systems", published in 1988 by The Benjamin/Cummings Publishing Company, Inc., which are incorporated herein by reference. Mapping and routing are also discussed by Stephen D. Brown et al on pages 45–86 and pages 117–145, respectively, of "Field-Programmable Gate Arrays", published 1992 by Kluwer Academic Publishers and incorporated herein by reference. Placement is discussed extensively by K. Shahookar and P. Mazumder of the Dept. Of Electrical Engineering and Computer Science, University of Michigan, in "VLSI Cell Placement Techniques", published June 1991 in pages 143–220 of ACM Computing Surveys, Vol. 23, No. 2, which are incorporated herein by reference.

From the compiled design, a program file such as a "bitstream", a sequence of data ("ones" and "zeros", or high and low bits) is created. The formats of two such bitstreams used in XC4000-Series FPGAs are described on pages 4-56 and 4-57 of the Xilinx 1996 Data Book entitled "The Programmable Logic Data Book" (hereinafter referred to as "the Xilinx Data Book"), available from Xilinx, Inc., 2100 Logic Drive, San Jose, Calif. 95124, which are incorporated herein by reference. (Xilinx, Inc., owner of the copyright, has no objection to copying these and other pages referenced herein but otherwise reserves all copyright rights whatsoever.) The generation of a bitstream file requires knowing the desired state of each programmable memory cell in the FPGA and the bit location in the bitstream corresponding to each such memory cell. Each bit in the bitstream is then set to the appropriate value for the corresponding memory cell. The generation of bitstream program files is well known in the art of configuration software for programmable ICs. For example, bitstream program files are used by many FGPA manufacturers, including Xilinx, Inc., as mentioned above. Bitstream program files are also used in the ORCA™ OR2C FPGAs from Lucent Technologies Inc. ("ORCA" is a trademark of Lucent Technologies, Inc.) The ORCA bitstream and the use thereof are described in pages 2-45 through 2-54 of the Lucent Technologies October 1996 Data Book entitled "Field-Programmable Gate Arrays", available from Microelectronics Group, Lucent Technologies Inc., 555 Union Boulevard, Room 30L-15P-BA, Allentown, Pa. 18103, which are incorporated herein by reference. Streams of configuration data are also used in the FLEX™ 8000 from Altera Corporation, as disclosed in Application Note 38 "Configuring Multiple FLEX 8000 Devices", May 1994, version 2, available from Altera Corporation, available from Altera Corporation, 2610 Orchard Parkway, San Jose, Calif. 95134-2020, which are incorporated herein by reference. ("FLEX" is a trademark of Altera Corporation.)

The bitstream is then used to configure a programmable IC. Several methods for loading bitstream data into programmable ICs are known. One such method is described by Stephen M. Trimberger in U.S. Pat. No. 5,426,379, issued Jun. 20, 1995, entitled "A Field Programmable Gate Array With Built-In Bitstream Data Expansion", which is incorporated herein by reference.

The design process is complicated and can be time-consuming. Therefore, many programmable IC vendors are now offering "macros" to their customers. These "macros" are circuits that have already been entered as either schematicor language-based descriptions. Therefore, a customer can save valuable development time by incorporating a vendor-supplied macro in a design rather than generating his or her own comprehensive circuit description. Further, a macro is tested and debugged by the vendor before it is provided to the customer, and therefore is more likely to produce a working circuit than a new circuit description entered by the customer.

One common form in which macros are provided to customers is in "libraries", typically as a set of schematic symbols and netlists referenced by these schematic symbols. Some macro libraries include high-level schematics having one or more levels of schematics below them. Xilinx, Inc., provides some macros in a form called "Relationally Placed Macros", or RPMs. RPMs are described on pages 4-71 and 4-72 of the Xilinx "Libraries Guide", published October 1995 and available from Xilinx, Inc., 2100 Logic Drive, San Jose, Calif. 95124, which are incorporated herein by reference. An RPM is a schematic that includes constraints defining the order and structure of the underlying circuits. The location of each element within the RPM is defined relative to each other element in the RPM, regardless of eventual placement in the overall design. For example, an RPM might contain 8 flip-flops constrained to be placed into four Configurable Logic Blocks (CLBs) in a vertical column. The column of four CLBs can then be placed anywhere in the FPGA. The schematics forming the RPM are user-editable.

Providing a macro to a customer in a user-editable format such as a language-based, schematic-based, or netlist description can have several consequences that may be considered undesirable by a vendor, such as a programmable IC vendor or a macro designer. For example, the macro can be copied, edited, and redistributed by the customer. The vendor's considerable investment in the design of the macro may therefore be lost. Similar disadvantages apply if the macro is easily reverse-engineered from the supplied description, even if the description is not readily edited in its originally provided format. A netlist, for example, can typically be reverse-engineered relatively easily.

Another disadvantage of user-editable macros is that such macros often comprise very complicated circuits, difficult to design and having tight timing requirements. If a design is changed in any way, the circuit may no longer be fully functional at the required speed. Therefore, it is not commercially feasible for a vendor to guarantee performance of the macro. Any such guarantee must carry prohibitions against modification of the design.

It is therefore desirable to have a method of generating and providing secure macros (i.e., macros that are difficult to edit or reverse-engineer) for programmable ICs.

Xilinx, Inc. did at one time have a method of generating and providing secure macros for its XC4000 family of FPGAs. These macros were called "hard macros". Hard macros are described in the "XC4000 Family Hard Macro Style Guide", published Sep. 3, 1991 and available from Xilinx, Inc., 2100 Logic Drive, San Jose, Calif. 95124, which is incorporated herein by reference in its entirety. A "hard macro" did not require schematics; instead, it included a schematic symbol that was used to include the macro in a customer design, and a netlist referenced by the schematic symbol and representing the macro circuitry. The netlist was encrypted and sent to customers in binary format, which made it difficult to edit or reverse-engineer the netlist.

One disadvantage of the hard macro format was that the area of the FPGA encompassed by the hard macro was totally dedicated to the contents of the macro. A customer could not place additional logic in a CLB within the area, or access any signal inside the area unless the signal had an output port as part of the defined hard macro. Further, the area of the FPGA encompassed by the hard macro had to be rectangular. If the logic fit best, or resulted in the fastest performance, in a non-rectangular area, the "extra" CLBs required to make the area rectangular were wasted. Further, hard macros did not include routing, not even the routing within the macro rectangle. The routing had to be added later when the macro was compiled along with the rest of the design. Therefore, timing of the macro logic was unpredictable.

It is desirable to have a method of generating and providing secure macros for programmable ICs that overcomes these disadvantages.

SUMMARY OF THE INVENTION

The bitstream information used to program a programmable IC is typically difficult to reverse-engineer. When a macro (or other circuit) is implemented in a localized area of the IC, the data for configuring the macro may still be distributed throughout the bitstream rather than in a continuous portion of the bitstream. Even if the bitstream data representing the macro is continuous, the relationship between the ones and zeros in the bitstream and the behavior of the macro is not easy to decipher. If bitstream "maps" are not published by a programmable IC vendor, as they typically are not, it is usually prohibitively time-consuming and difficult to derive a circuit description from a bitstream. Therefore, the method of the invention provides a bitstream to a user, rather than providing a user-editable macro.

However, since a macro typically comprises only a portion of a complete design for a programmable IC, it is not desirable to provide a final bitstream comprising only the macro to the user. If a final bitstream comprising only the macro is provided to the user, and the bitstream is downloaded conventionally to a programmable IC, the user is unable to add his or her own circuits to the design. In this case, the bitstream as provided undesirably comprises a complete design description for the programmable IC.

Therefore, according to one embodiment of the invention, compilation software is provided to the user that combines the data from a "macro bitstream" (the bitstream comprising the macro data description) and the data from the user's own circuits (for example, a circuit description in netlist form) to create the complete bitstream (the bitstream comprising the completed design for the programmable IC). Before compiling the design, the user sets parameters for the software that establish that the macro will be included. These parameters function as a placeholder to reserve for the macro both an area of the programmable IC and the related portion of the complete bitstream. These parameters can be set, for example, by including a macro placeholder in the design. The macro placeholder may be a schematic symbol, an "HDL instantiation" (a text file or a portion thereof written in an HDL language, instantiating a circuit and listing the inputs and outputs thereof), or some other means for parameterizing software. In another embodiment, compilation software parameters are set by the user to indicate that a macro from a predetermined library of macros should be included. In this embodiment, the compilation software includes information as to the size and shape of each available macro, and may also include information as to the location of macro input/output ports. However, in the preferred embodiment, a macro placeholder is used to supply such information. For example, one such macro placeholder could reserve a space in an unspecified location of the programmable IC, the space being 3 CLBs high and 2 CLBs wide. For another example, the placeholder could reserve certain portions of several different CLBs, while specifying the relative locations of the reserved portions of the CLBs. The macro placeholder is incorporated into the design, for example, by placing a symbol representing the macro into a schematic for the user design. Another method is by instantiating the macro (in effect, incorporating it by reference) in HDL code for the user design. The compilation and bitstream generation software then combine the macro bitstream and the user circuit description to produce a complete bitstream for a programmable IC.

A method for including macros in programmable ICs according to a first aspect of the invention comprises the steps of: 1) generating a macro bitstream; 2) providing the macro bitstream to a user; 3) generating a user circuit description; and 4) combining the macro bitstream and the user circuit description to generate a complete bitstream.

A method for using macros for programmable ICs according to a second aspect of the invention comprises the steps of: 1) generating a circuit description for a user design; 2) receiving a macro bitstream; 3) specifying that the macro be included in the user design; and 4) producing a complete bitstream for a programmable IC by combining the circuit description and the macro bitstream.

A method for generating macro bitstreams for inclusion in complete bitstreams for programming programmable ICs according to a third aspect of the invention comprises the steps of: 1) creating bitstream data representing a macro; 2) placing the bitstream data representing the macro into one or more portions of a macro bitstream; and 3) completing the macro bitstream by filling the remaining portions of the macro bitstream with data at least some of which will be omitted from the complete bitstream.

In some embodiments of the invention, the macro bitstream is larger, even much larger, than the number of bits needed to supply the macro data. Thus it is possible to camouflage the actual macro data, making it difficult to reverse engineer the macro from the macro bitstream. In one such embodiment, the user specifies a physical location on the programmable IC for the macro, so the macro data is probably placed in a different location in the complete bitstream than in the macro bitstream. Additionally, the macro data is probably placed in different locations in the complete bitstream for different user designs. In another embodiment, the macro bitstream and the complete bitstream represent the same programmable IC architecture, but not the same device, so they are of similar formats but different lengths. In another embodiment, the macro bitstream is further encrypted before being provided to the user, in order to supply a further layer of protection in preventing reverse engineering of the macro.

BRIEF DESCRIPTION OF THE DRAWINGS

The present invention is illustrated by way of example, and not by way of limitation, in the following figures, in which like reference numerals refer to similar elements.

DETAILED DESCRIPTION OF THE DRAWINGS

Multiple embodiments of a method for generating and using macros for programmable ICs according to the invention are described. In the following description, numerous specific details are set forth in order to provide a more thorough understanding of the present invention. However, it will be apparent to one skilled in the art that the present invention may be practiced without these specific details. In other instances, well-known features have not been described in detail in order not to unnecessarily obscure the present invention.

Bitstreams and Configuration Data

FIG. 1A–3B demonstrate the correspondence between the configuration data in a bitstream and the CLBs in an FPGA being programmed by the bitstream.

Figure 1A:
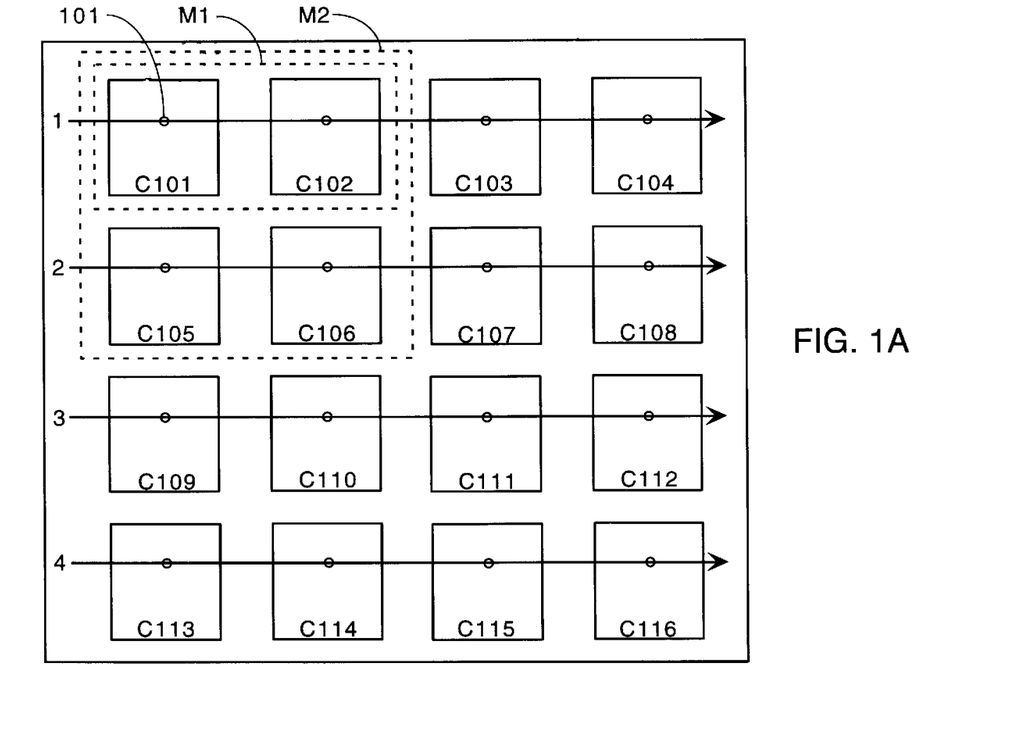
FIG. 1A shows a first example FPGA with 16 CLBs. Arrows show the FPGA configuration bits in the order they occur in the configuration bitstream.
Figure 1B:
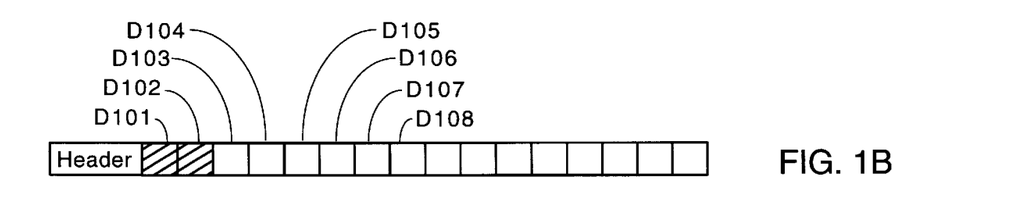
FIG. 1B shows the sequential format of a bitstream for the FPGA of FIG. 1A, and identifies the portions of the bitstream comprising configuration data for the macro M1 of FIG. 1A.
Figure 1C:
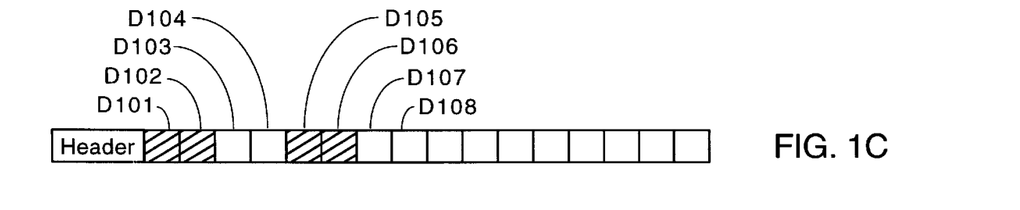
FIG. 1C shows the sequential format of a bitstream for the FPGA of FIG. 1A, and identifies the portions of the bitstream comprising configuration data for the macro M2 of FIG. 1A.

FIG. 1A shows a first example FPGA having 4 rows and 4 columns of CLBs. (A typical FPGA has many more rows and columns of CLBs, plus additional blocks such as Input/Output Blocks (IOBs), clock buffers, and so forth, but these have been omitted so as not to obscure the figure. Only CLBs are considered in this discussion, but the concept can be extended to cover other types of logic and related structures.) In this example, each CLB (C101, C102, . . . , C116) is programmed using configuration data represented by a small circle in FIG. 1A. For example, configuration data 101 is used to program CLB C101. In the example of FIGS.1A–1C, the configuration data in the bitstream of FIGS. 1B and 1C is loaded into the FPGA of FIG. 1A. Arrows 1, 2, 3, 4 show the order of bits in the bitstream. In this example, the order of configuration data in the bitstream corresponds to the following sequence of CLBS: C101, C102, 0103, 0104, . . . , C116. CLBs C101 and C102 can be used to implement a 2-CLB macro designated M1. Similarly, CLBs C101, C102, C103, and C104 can be used to implement a 4-CLB macro designated M2.

FIGS. 1B and 1C show the sequential format of bitstreams for programming the FPGA of FIG. 1A. Each bitstream begins with a string of header information, as described on page 4-56 of the Xilinx Data Book, which is incorporated herein by reference. In the simplest case, the remaining portion of the bitstream consists of equal-sized blocks of data comprising sequences of high and low bits, each block representing a single CLB. For example, data block D101 comprises configuration data 101 loaded into CLB C101. Similarly, data block D102 comprises configuration data for CLB 202, and so forth. The shaded portion of the bitstream in FIG. 1B shows the blocks of configuration data that would be required to program macro M1. The shaded portion of the bitstream in FIG. 1C shows the blocks of configuration data that would be required to program macro M2. As shown in FIG. 1B, the configuration data D101, D102 for macro M1 comprises a continuous portion of the bitstream. However, FIG. 1C shows that the configuration data D101, D102, D105, D106 for macro M2 comprises two portions of the bitstream, separated by configuration data D103, D104 for CLBs C103, C104.

The bitstreams shown in FIGS. 1B and 1C are simplified in order not to obscure the figures. An actual bitstream includes, in addition to the blocks of data for CLBs, additional data for IOBs, clock buffers, and so forth. Some or all of this configuration data may be interspersed between the configuration data for the CLBs.

Figure 2A:
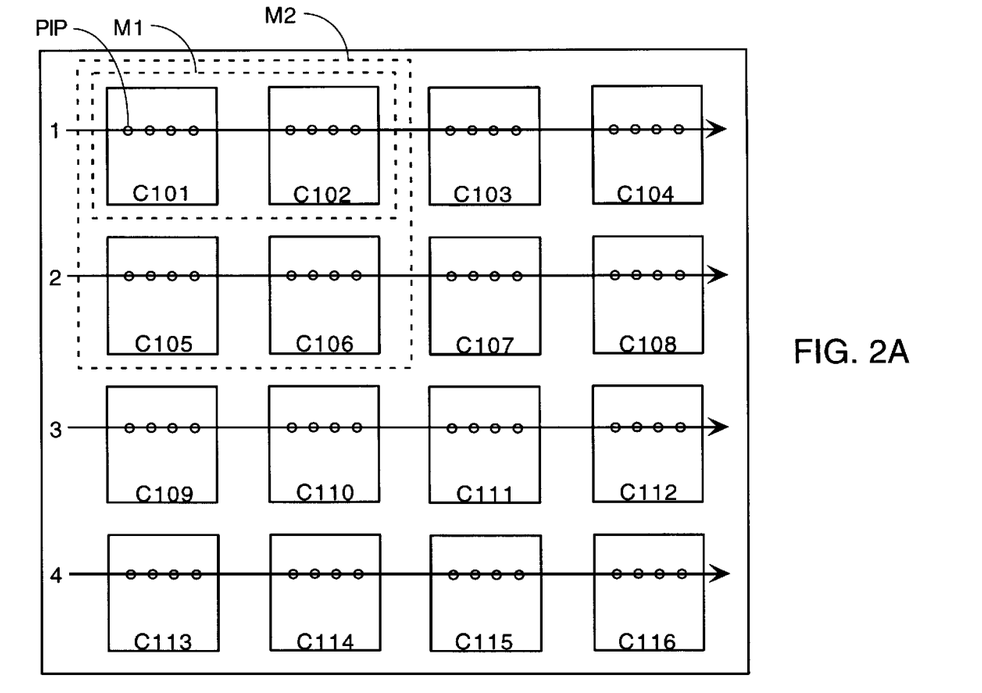
FIG. 2A shows a second example FPGA with 16 CLBs. Arrows show the FPGA configuration bits in the order they occur in the configuration bitstream.

FIG. 2A shows a second example FPGA having 4 rows and 4 columns of CLBs. In this example, each CLB (C101, C102, . . . , C116) is programmed using configuration data represented by four small circles. Each circle represents a configurable memory cell, which may provide a look-up table (LUT) value, select a programmable function, define the state of a programmable interconnection point (PIP), or otherwise determine the functionality of the programmable IC. An example memory cell in FIG. 2A represents a PIP. Each PIP is either activated or deactivated, depending on whether the corresponding configuration bit is a one or a zero. In one embodiment, PIPs are implemented as transistors, which are either on or off. These PIPs control the behavior of a CLB by connecting or disconnecting signal lines. Although FIG. 2A shows each CLB having four memory cells, a CLB in an FPGA can have hundreds of such memory cells. Only four memory cells are shown per CLB, in order to simplify the figure.

Figure 2B:
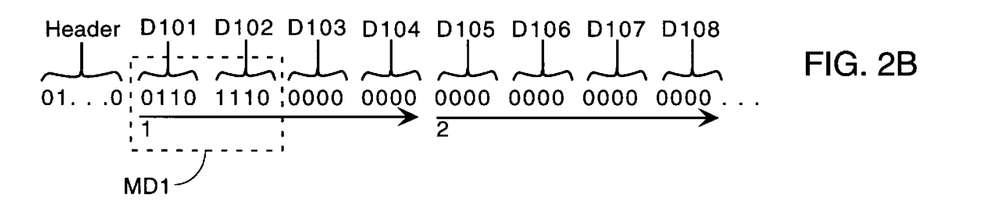
FIG. 2B shows an example bitstream for the FPGA of FIG. 2A, and identifies the portions of the bitstream comprising configuration data for the macro M1 of FIG. 2A.
Figure 2C:
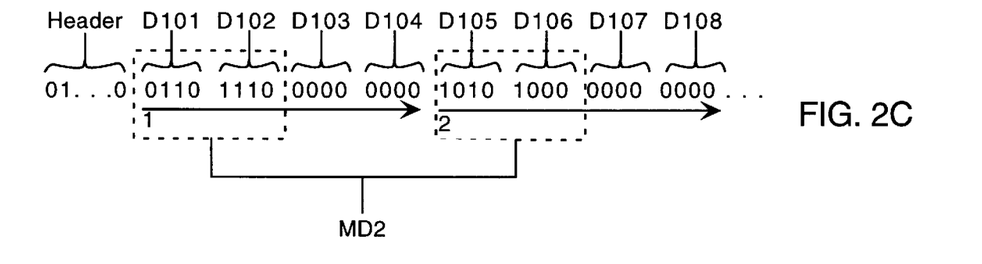
FIG. 2C shows an example bitstream for the FPGA of FIG. 2A, and identifies the portions of the bitstream comprising configuration data for the macro M2 of FIG. 2A.

FIGS. 2B and 2C show the sequential format of bitstreams for programming the FPGA of FIG. 2A. Each bitstream begins with a string of header information, as described on page 4-56 of the Xilinx Data Book, which is incorporated herein by reference. In these figures, each block of configuration data comprises four bits, corresponding to the memory cells of FIG. 2A. The first eight bits MD1 after the header comprise the configuration data for CLBs C101 and C102, and therefore can be used to program macro M1, as shown in FIG. 2B. FIG. 2C shows that the configuration data MD2 for CLBs C101, C102, C105, C106 for macro M2 comprises two separated portions of the bitstream.

Figure 3A:
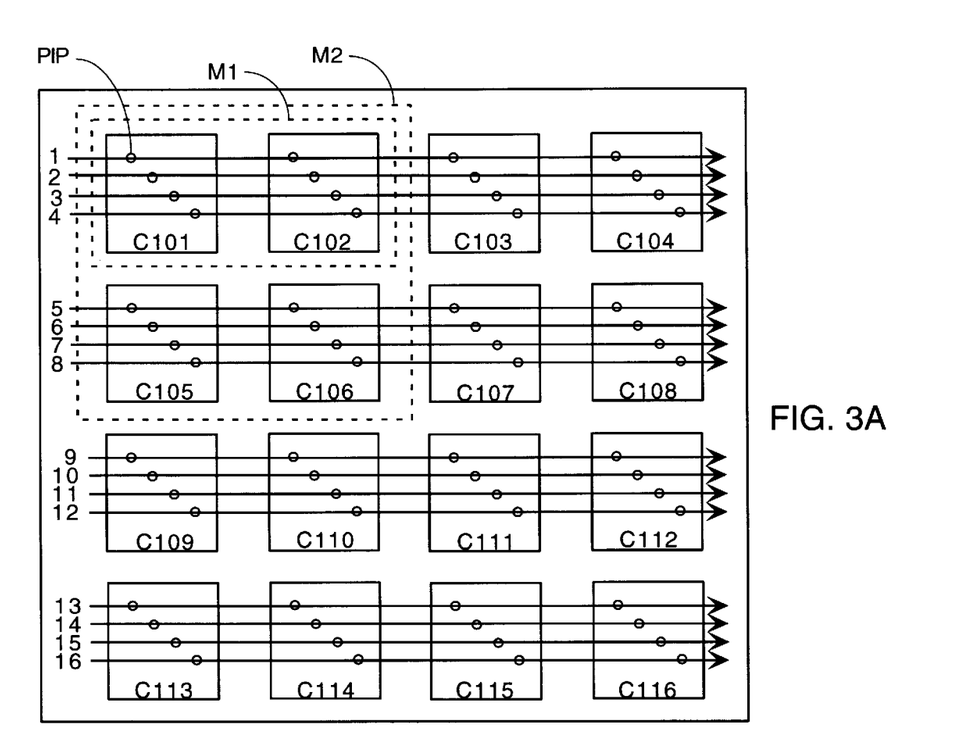
FIG. 3A shows a third example FPGA with 16 CLBs. Arrows show the FPGA configuration bits in the order they occur in the configuration bitstream.
Figure 3B:
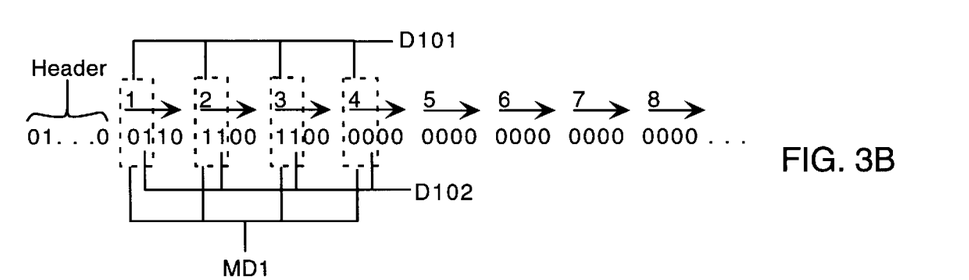
FIG. 3B shows an example bitstream for the FPGA of FIG. 3A, and identifies the portions of the bitstream comprising configuration data for the macro M1 of FIG. 3A.
Figure 3C:
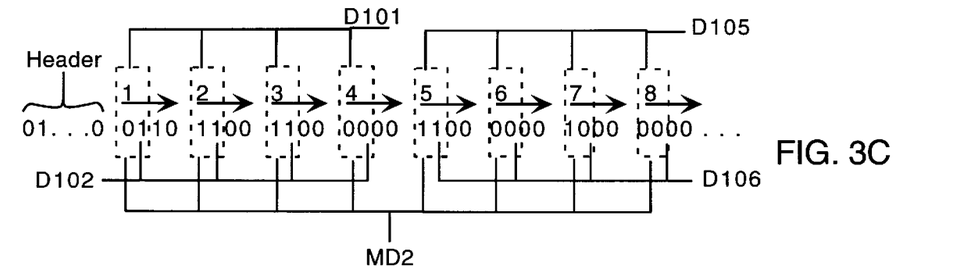
FIG. 3C shows an example bitstream for the FPGA of FIG. 3A, and identifies the portions of the bitstream comprising configuration data for the macro M2 of FIG. 3A.

An FPGA usually does not use one of the simple configuration sequences shown in FIGS.1A–2C. Instead of configuring an entire CLB before moving on to the next CLB, the configuration sequence spans an entire row of CLBs many times before moving to the next row, as shown in FIG. 3A. In the example of FIG. 3C, 16 arrows (1, 2, 3, ..., 16) show the order of bits in the bitstream. Arrow labels in FIGS. 3A, 3B, and 3C show correspondence between memory cells in the FPGA and configuration bits in the bitstreams. FIG. 3B shows the effect of this change on the configuration data representing macro M1. FIG. 3B shows the effect of this change on the configuration data representing macro M2. The configuration data for each CLB is distributed through the bitstream. The bits controlling macros M1 and M2 are not as easily discerned as in the examples of FIGS. 1A–2C.

In an FPGA manufactured today, there are dozens or even hundreds of memory cells in each CLB. In addition to the configuration data for the CLBs, there is configuration data for IOBs, and there may be additional data for clock buffers, phase-locked loops, special blocks, and so forth. This data is typically interspersed throughout the bitstream, not tidily placed at the beginning or the end of the bitstream, where it could be easily removed from consideration during a reverse engineering effort. Additionally, the configuration data in a bitstream is typically organized into "data frames", blocks of information including other data than just the state of each memory cell in the CLB. For example, a single frame may include a Start Field, and a Cyclic Redundancy Check (CRC) value for detecting errors in the bitstream, as described on pages 4-56 and 4-57 of the Xilinx Data Book, which are incorporated herein by reference.

In summary, a bitstream used to transfer configuration data into an FPGA is a string of binary data which can be so complicated as to amount to an encryption scheme. Although not unbreakable, in practical terms this encryption is sufficient to deter all but the most determined of reverse engineers.

Method for Encoding Macros in Bitstream Format

Figure 4:
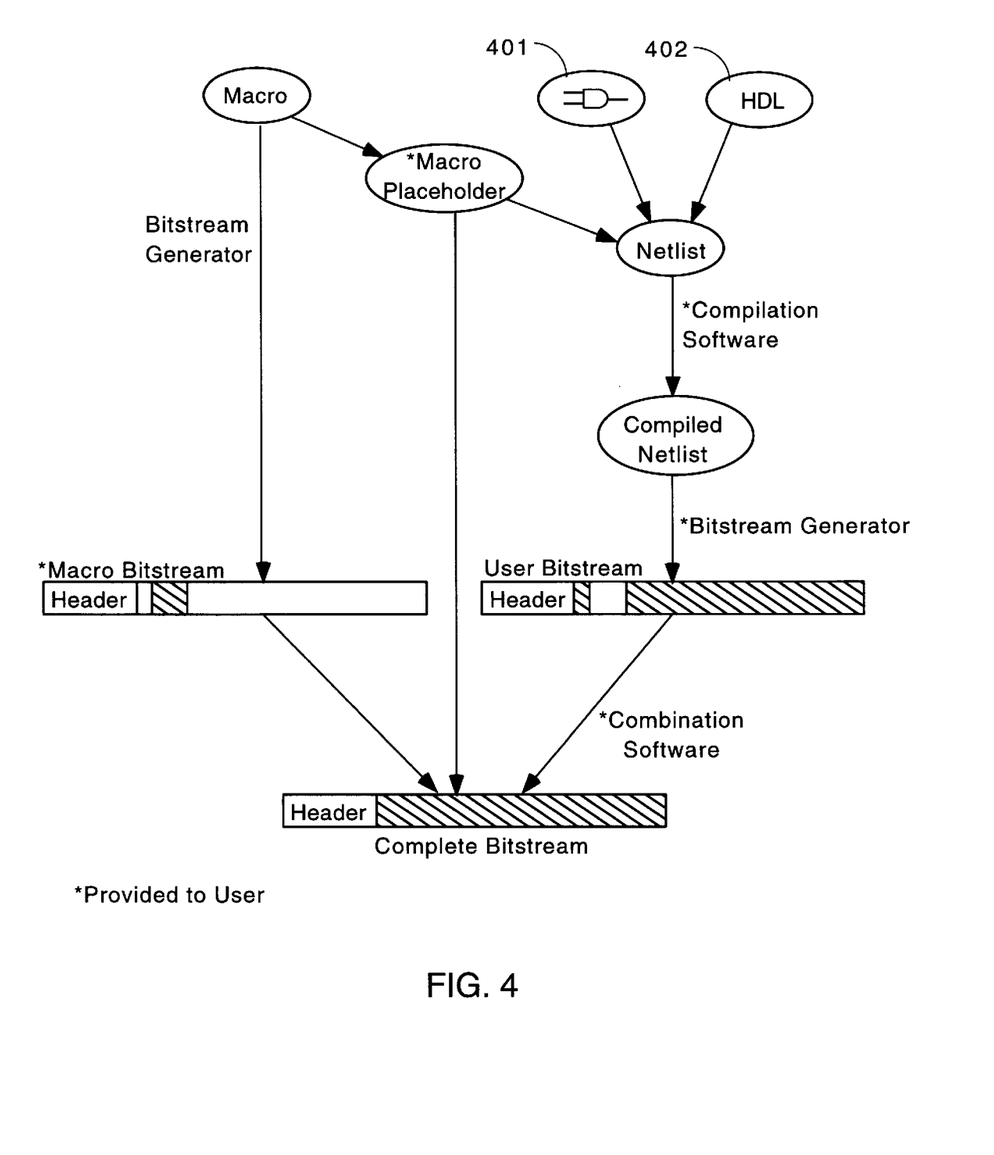
FIG. 4 is a flow diagram showing the sequence of steps according to a first embodiment of the invention.

FIG. 4 is a flow diagram showing the sequence of steps according to one embodiment of the inventive method. In FIG. 4, the configuration data for the macro is shown as a contiguous portion of the bitstream (as in FIG. 1B, for example), in order to simplify the figure.

In the embodiment of FIG. 4, a macro is designed, typically by an IC vendor or a macro designer. From the macro design, a Macro Bitstream is generated using software called a Bitstream Generator. Bitstream generation software is well-known to one of ordinary skill in the art of programmable IC configuration software. The Macro Bitstream includes the macro data description. In some embodiments, the remaining portions of the macro bitstream are filled with "filler" data which will be omitted from the complete bitstream. In one embodiment, this filler data makes it difficult to isolate the macro data from the macro bitstream, thereby making it more difficult to reverse-engineer the macro.

Figure 4A:
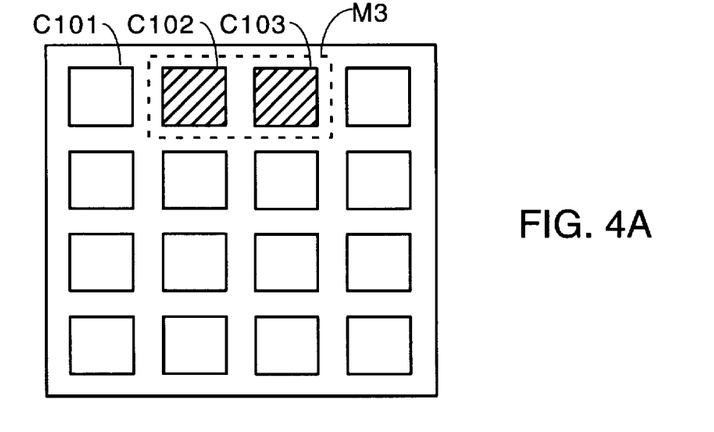
FIG. 4A shows the location of a macro in a CLB array in an example FPGA that can be programmed according to the first method of the invention.

A Macro Placeholder may also be generated. The Macro Placeholder may be a schematic symbol, an "HDL instantiation" (a text file or a portion thereof written in an HDL language, instantiating a circuit and listing the inputs and outputs thereof), or some other means for parameterizing software to reserve for the macro both an area of the programmable IC and the related portion of the complete bitstream. The Macro Placeholder specifies that the macro will be included in the user design. In one embodiment, this information is supplied by the user setting software parameters before running the configuration software. FIG. 4A shows an example of a portion of a programmable IC reserved for macro M3. The reserved portion is shaded and comprises CLBs C102, C103.

Figure 4B:
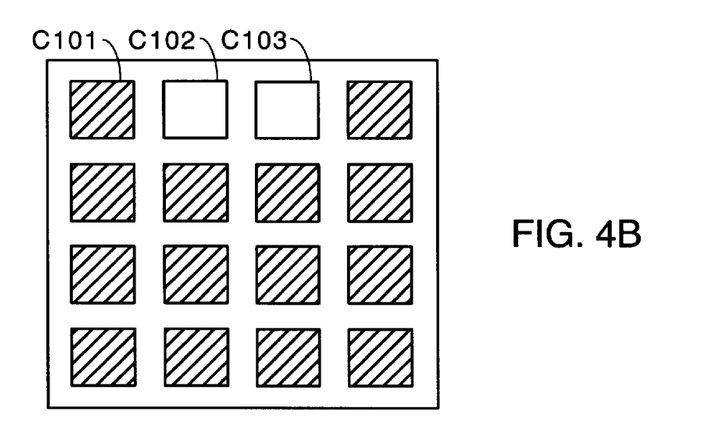
FIG. 4B shows the CLBs used by user circuits in the example FPGA of FIG. 4A.

In the method of FIG. 4, the Macro Bitstream is provided to a user. A Macro Placeholder may also be provided to the user, or the user may set parameters establishing the Macro Placeholder. The user also generates a user circuit description, which may include, for example, schematics 401 and HDL descriptions 402. In the embodiment of FIG. 4, the user circuit description is combined with the Macro Placeholder to create a Netlist. Compilation Software then compiles the Netlist, utilizing the Macro Placeholder to reserve for the macro both an area of the programmable IC and the related portion of the complete bitstream. In one embodiment, the compilation step comprises Mapping, Placement, and Routing, all of which steps are familiar to one of ordinary skill in the art of programmable IC place and route software. In the example of FIG. 4A, the user circuit can utilize the portion of the programmable IC shown shaded in FIG. 4B.

Figure 4C:
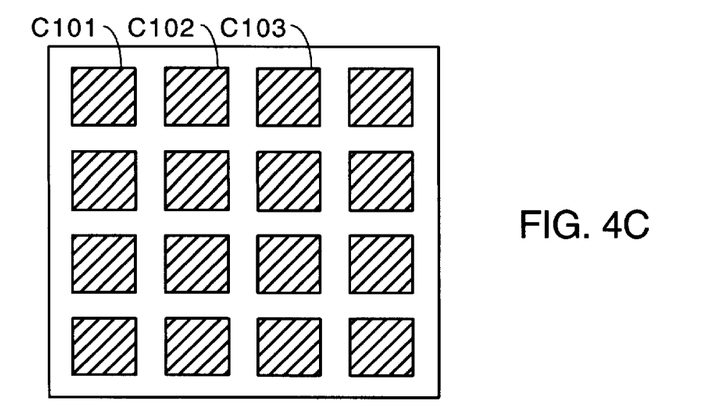
FIG. 4C shows the CLBs used in the complete design for the example FPGA of FIG. 4A.

As shown in FIG. 4, Bitstream Generator software is utilized to generate a User Bitstream representing the user circuit. In one embodiment, the input to the Bitstream Generator is a Netlist representing the user circuit. The User Bitstream does not utilize the portion of the IC or the portion of the bitstream reserved for the Macro. In one embodiment, the User Bitstream is generated in an encrypted format. Finally, the macro bitstream and the user bitstream are combined using Combination Software to produce a Complete Bitstream. When the Complete Bitstream is downloaded to the programmable IC, all portions of the programmable IC required for the complete design can be used, as shown in FIG. 4C. In one embodiment, the Complete Bitstream is generated in an encrypted format, and decrypted in the programmable IC before being loaded into the configuration memory cells of the programmable IC.

The combination software must have a way of identifying which portion of the macro bitstream represents the macro. In one embodiment, only the portion of the macro bitstream representing the macro is incorporated into the complete bitstream. If a macro placeholder (which reserves a portion of the IC and of the bitstream for the macro) is provided to the user, the placeholder already includes the information as to which portion of the bitstream represents the macro. Therefore, the placeholder can be provided to the Combination Software. In one embodiment, another method of providing this information is used. This embodiment is shown in FIG. 4D, which illustrates the function performed by the combination software of this embodiment.

Figure 4D:
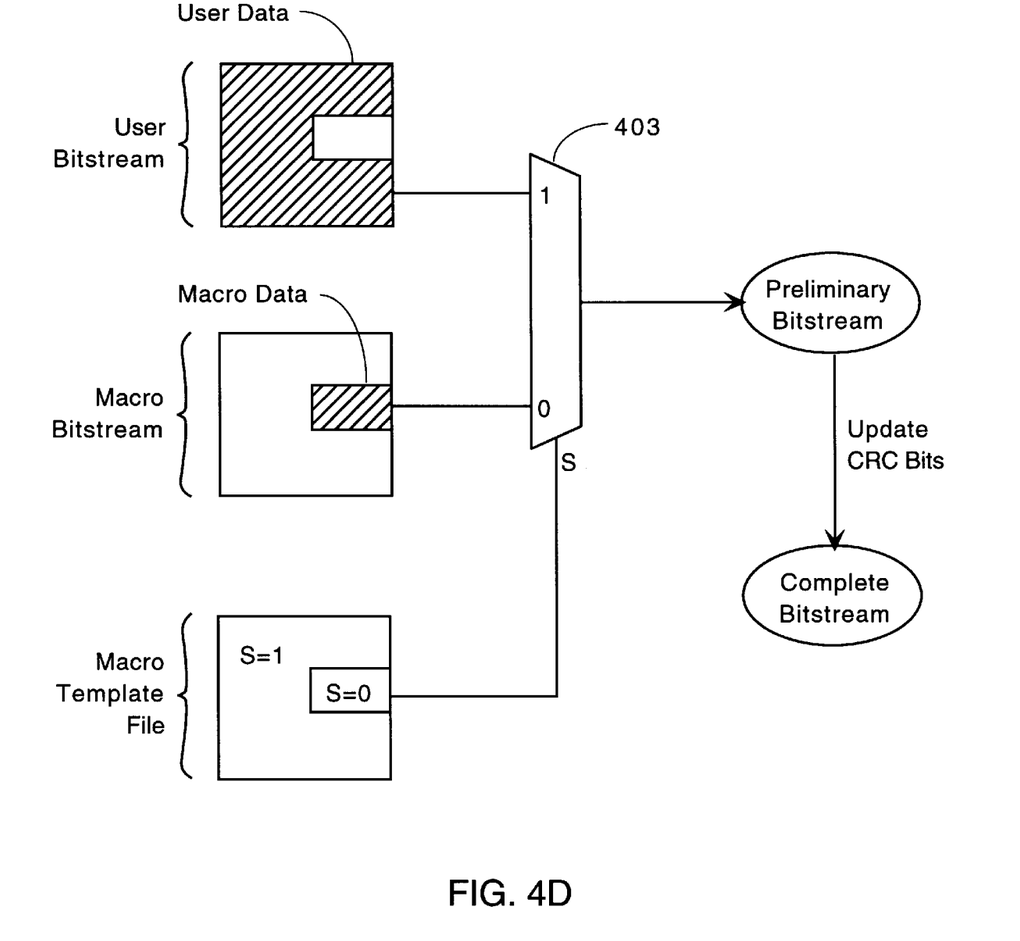
FIG. 4D shows the series of steps performed by the combination software of one embodiment.

In the embodiment of FIG. 4D, a Macro Template File is provided to the user. The Macro Template File may be a bitstream having, for example, zeros in all bit locations reserved for the macro and ones in all locations reserved for user circuits. The macro bitstream and the user bitstream are both input into multiplexer 403, which selects between the two bitstreams based on the state of the corresponding bit in the Macro Template File. (Note that the information in the Macro Template File, i.e. the area of the complete bitstream to be reserved for the macro, may be the same information as that contained in the Macro Placeholder, although it may be in a different format since the Macro Template File is essentially a bit-mask file. The two data sets can be combined into a single file rather than being in two separate files.) The output of multiplexer 403 in this embodiment is a Preliminary Bitstream, which must be further processed by updating CRC data to create the Complete Bitstream. In one embodiment, the Macro Template File is encrypted to make it more difficult to reverse engineer the macro. In another embodiment, the Macro Placeholder includes information for "decoding" the macro bitstream, such as a tag that calls for extracting only every tenth bit of the bitstream and concatenating these bits to form the macro.

Figure 5:
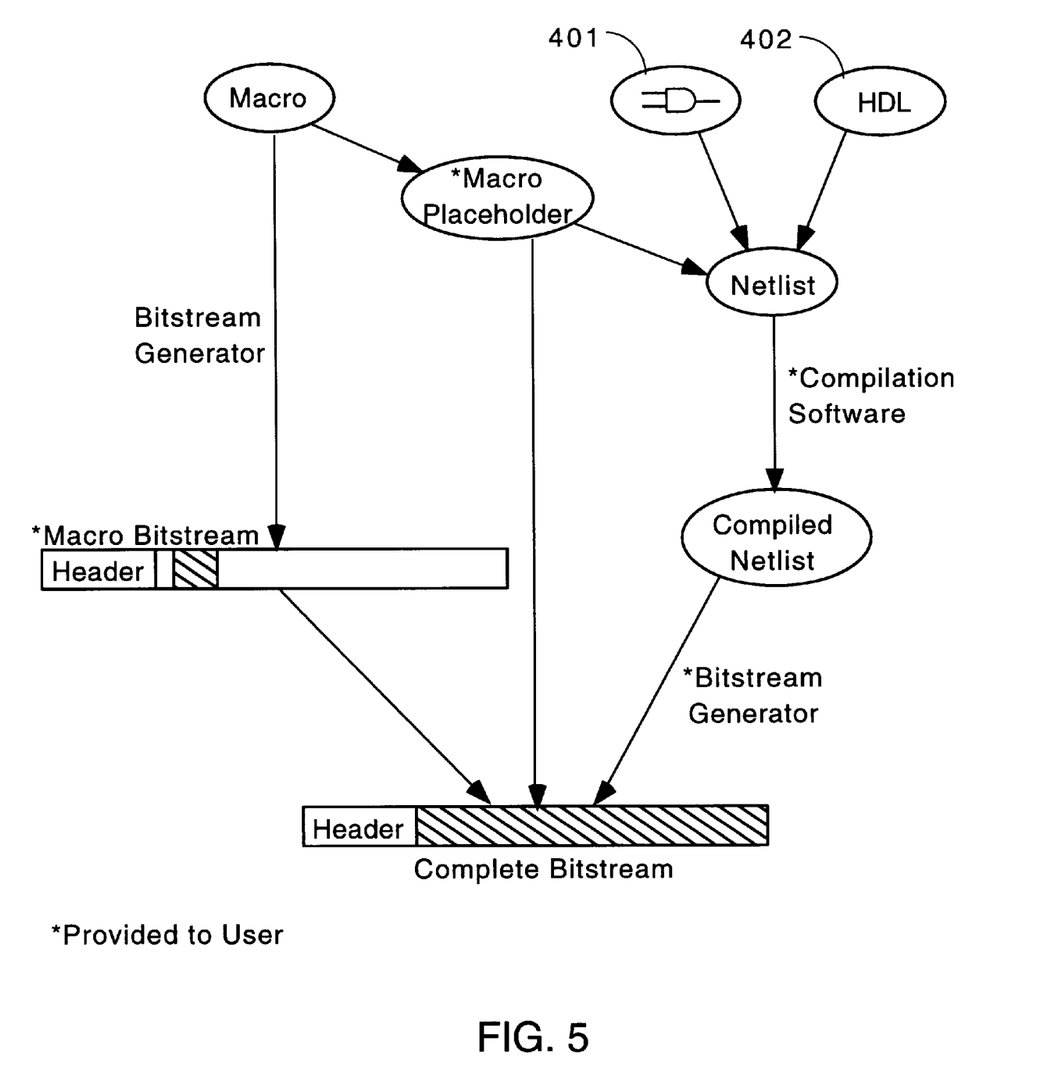
FIG. 5 is a flow diagram showing the sequence of steps according to a second embodiment of the invention.

FIG. 5 is a flow diagram showing the sequence of steps according to a second embodiment of the inventive method. In this embodiment, a macro and Macro Bitstream are generated as in the embodiment of FIG. 4, and the Macro Bitstream is provided to a user. A Macro Placeholder may also be provided to the user, or the user may set parameters establishing the Macro Placeholder. The user also generates a user circuit description, which may include, for example, schematics 401 and HDL descriptions 402. The user circuit description is combined with the Macro Placeholder to create a Netlist, which is then compiled to create a Compiled Netlist. However, instead of generating a User Bitstream from the Compiled Netlist, the Bitstream Generator software combines the Netlist and the Macro Bitstream directly to produce the Complete Bitstream.

Additional Embodiments

Absolute placement information for a macro (i.e., information on where the macro as a whole is to be placed in the programmable IC) does not necessarily need to be supplied to the compilation software, since such placement can be performed by the compilation software itself. However, in one embodiment of the method of the invention, the macro placeholder can be modified to include additional information other than the size and shape of the macro, such as the location of the macro on the programmable IC. This ability can be an advantage, for example, in macros where speed in getting on and off the chip is critical. In such a case, for example, the macro may need to be positioned next to particular input/output pads on the IC, or close to a global distribution buffer such as a clock buffer. The location information in the macro placeholder may result in the configuration data for the macro being placed in a different location in the complete bitstream than its location in the macro bitstream.

In one embodiment of the invention, a plurality of macros are placed in a single programmable IC.

In another embodiment of method of the invention, the macro bitstream is of a different length than the complete bitstream. This may be the case, for example, if an IC vendor has a product line of programmable ICs of different sizes, all using the same bitstream format, i.e., all using the same format for a single frame of bitstream data while the number of frames varies with the size of the programmable IC. One such product line is the XC4000-Series line of FPGAs offered by Xilinx, Inc. The frame format for this product line is shown on page 4-56 of the Xilinx Data Book, which page is incorporated herein by reference. The macro bitstream could be distributed, for such a product line, in a bitstream of a size appropriate to the smallest programmable IC in the product line. The compilation software or bitstream combination software could take the information from the shorter macro bitstream and incorporated it into the larger complete bitstream in an appropriate location determined by either the macro placeholder or the placement software.

The bitstream information for a macro includes routing. Therefore, the timing of each macro is predictable and can potentially be guaranteed by the macro vendor. Therefore, this technique can be used for timing-sensitive applications such as a Peripheral Component Interconnect (PCI) circuit. Further, a macro need not be of any particular shape; in fact, it need not even use contiguous CLBs. By altering the portion of the bitstream representing the macro, user logic can be placed within the IC area encompassed by the macro, provided that the macro placeholder includes information as to which portions of the IC area encompassed by the macro are available for additional logic. In fact, a macro need not consume all of each CLB in the macro area; unused logic in a partially used CLB remains free for user logic. Similarly, signals within the macro may be accessible to the user if sufficient routing remains available (i.e., unused by other signals in the macro) to connect the signal to the user circuits.

It has been demonstrated that the method of the present invention allows a programmable IC vendor or macro designer to distribute a macro that is difficult to edit or reverse-engineer, and also offers the advantages of fixed timing, the ability to add user circuits to form a complete design, the ability (in some embodiments) to add logic to the macro area of the programmable IC and to access signals therein, and, in some embodiments, freedom to specify the location in the programmable IC in which the macro is to be placed. Thus it will be understood that the present invention provides a novel method of generating and using macros for programmable ICs.

Those having skill in the relevant arts of the invention will now perceive various modifications and additions which may be made as a result of the disclosure herein of preferred embodiments. Accordingly, all such modifications and additions are deemed to be within the scope of the invention, which is to be limited only by the appended claims and their equivalents.

What is claimed is:

1. A method for including a macro in a programmable IC, comprising the steps of:

a) generating a macro bitstream;

b) providing said macro bitstream to a user;

c) generating a user circuit description; and d) combining said macro bitstream and said user circuit description to generate a complete bitstream for programming the programmable IC.

2. The method of claim 1, wherein the programmable IC is an FPGA.

3. The method of claim 1, wherein said user circuit description comprises a netlist.

4. The method of claim 1, wherein the macro has predictable timing.

5. The method of claim 1, wherein:

one or more portions of said macro bitstream comprise macro bitstream data representing the macro;

one or more portions of said complete bitstream comprise complete bitstream data representing the macro; and said complete bitstream data is different from said macro bitstream data, said complete bitstream data having been altered from said macro bitstream data to permit connections between signals in the macro and circuits in said user circuit description.

6. The method of claim 1, wherein:

one or more portions of said macro bitstream comprise macro bitstream data representing the macro;

one or more portions of said complete bitstream comprise complete bitstream data representing the macro; and said complete bitstream data is different from said macro bitstream data, said complete bitstream data having been altered from said macro bitstream data to permit the addition of user logic to the area of the programmable IC encompassed by the macro.

7. The method of claim 1, where said macro bitstream and said complete bitstream are of different lengths.

8. The method of claim 1, wherein:

one or more portions of said macro bitstream comprise macro bitstream data representing the macro;

one or more portions of said complete bitstream comprise complete bitstream data representing the macro; and the position of said macro bitstream data within said macro bitstream is different from the position of said complete bitstream data within said complete bitstream.

9. The method of claim 1, further comprising the step of:

generating a macro placeholder to be used in generating said user circuit description.

10. The method of claim 9, further comprising the step of:

modifying said macro placeholder to specify the location of the macro in the programmable IC.

11. The method of claim 9, further comprising the step of:

providing said macro placeholder to the user.

12. A method for using a macro for a programmable IC, comprising the steps of:

a) generating a user circuit description for a user design;

b) receiving a macro bitstream;

c) specifying that the macro be included in the user design; and d) producing a complete bitstream for a programmable IC by combining said circuit description and said macro bitstream.

13. The method of claim 12, wherein the programmable IC is an FPGA.

14. The method of claim 12, wherein said user circuit description comprises a netlist.

15. The method of claim 12, wherein the macro includes routing, thereby providing predictable timing.

16. The method of claim 12, wherein:

one or more portions of said macro bitstream comprise macro bitstream data representing the macro;

one or more portions of said complete bitstream comprise complete bitstream data representing the macro; and said complete bitstream data is different from said macro bitstream data, said complete bitstream data having been altered from said macro bitstream data to permit connections between signals in the macro and circuits in said user circuit description.

17. The method of claim 12, wherein:

one or more portions of said macro bitstream comprise macro bitstream data representing the macro;

one or more portions of said complete bitstream comprise complete bitstream data representing the macro; and said complete bitstream data is different from said macro bitstream data, said complete bitstream data having been altered from said macro bitstream data to permit the addition of user logic to the area of the programmable IC encompassed by the macro.

18. The method of claim 12, where said macro bitstream and said complete bitstream are of different lengths.

19. The method of claim 12, wherein:

one or more portions of said macro bitstream comprise macro bitstream data representing the macro;

one or more portions of said complete bitstream comprise complete bitstream data representing the macro; and the position of said macro bitstream data within said macro bitstream is different from the position of said complete bitstream data within said complete bitstream.

20. The method of claim 12, further comprising the step of:

receiving a macro placeholder to be used in specifying that the macro be included in the user design.

21. The method of claim 20, further comprising the step of:

modifying said macro placeholder to specify the location of the macro in the programmable IC.

22. The method of claim 12, further comprising the step of:

setting software parameters to reserve for the macro both an area of the programmable IC and the related portion of said complete bitstream.

23. The method of claim 12, further comprising the step of:

setting software parameters to specify the location of the macro in the programmable IC.

24. The method of claim 12, wherein said macro bitstream is encrypted.

25. A method for generating a macro bitstream for inclusion in a complete bitstream for programming a programmable IC, comprising the steps of:

a) creating bitstream data representing a macro;

b) placing said bitstream data representing said macro into one or more portions of a macro bitstream; and c) completing said macro bitstream by filling the remaining portions of said macro bitstream with data at least some of which will be omitted from the complete bitstream.

26. The method of claim 25, wherein the programmable IC is an FPGA.

27. The method of claim 25, wherein said macro includes routing, thereby providing predictable timing.

28. The method of claim 25, wherein:

one or more portions of said macro bitstream comprise macro bitstream data representing the macro;

one or more portions of said complete bitstream comprise complete bitstream data representing the macro; and said complete bitstream data is different from said macro bitstream data.

29. The method of claim 28, wherein:

said complete bitstream data is altered from said macro bitstream data to permit connections between signals in the macro and circuits in said user circuit description.

30. The method of claim 28, wherein:

said complete bitstream data is altered from said macro bitstream data to permit the addition of user logic to the area of the programmable IC encompassed by the macro.

31. The method of claim 25, where said macro bitstream and said complete bitstream are of different lengths.

32. The method of claim 25, wherein:

one or more portions of said macro bitstream comprise macro bitstream data representing the macro;

one or more portions of said complete bitstream comprise complete bitstream data representing the macro; and the position of said macro bitstream data within said macro bitstream is different from the position of said complete bitstream data within said complete bitstream.

33. The method of claim 25, wherein:

said data at least some of which will be omitted from the complete bitstream comprises data bits that make it difficult to isolate the macro data from the macro bitstream.

34. The method of claim 25, further comprising the step of:

d) providing said completed macro bitstream to a user.

35. The method of claim 25, further comprising the step of:

d) encrypting said completed macro bitstream.

36. The method of claim 35, further comprising the step of:

e) providing said encrypted macro bitstream to a user.

37. A method for providing macro data for inclusion in a complete bitstream for programming a programmable IC, comprising the steps of:

a) creating bitstream data representing a macro;

b) placing said bitstream data representing said macro into one or more portions of a macro bitstream;

c) generating a macro placeholder to reserve for the macro both an area of the programmable IC and the related portion of the complete bitstream; and d) providing said macro bitstream and said macro placeholder to a user.

38. A method for including a macro in a programmable IC, comprising the steps of:

a) generating a macro bitstream;

b) encrypting said macro bitstream;

c) providing said encrypted macro bitstream to a user;

d) generating a user circuit description; and e) combining said encrypted macro bitstream and said user circuit description to generate a complete bitstream for programming the programmable IC.

* * * * *